United States Patent [19]
Shirane

[11] Patent Number: 5,796,694
[45] Date of Patent: Aug. 18, 1998

[54] METHOD AND APPARATUS FOR DRIVING A RECORDING MEDIUM

[76] Inventor: Kyoichi Shirane, 7-35, Kitashinagawa 6-chome, Shinagawa-ku, Toyko, Japan

[21] Appl. No.: 957,186

[22] Filed: Oct. 24, 1997

Related U.S. Application Data

[63] Continuation of Ser. No. 702,890, Aug. 26, 1996, abandoned.

[30] Foreign Application Priority Data

Aug. 31, 1995 [JP] Japan ................................. 7-224074

[51] Int. Cl.⁶ ............................................. G11B 7/00
[52] U.S. Cl. ................... 369/59; 369/48; 369/50; 369/58
[58] Field of Search .................... 369/59, 60, 54, 369/58, 47, 48, 49, 50, 83, 84, 32; 360/13, 14.1, 14.2, 14.3, 15, 48

[56] References Cited

U.S. PATENT DOCUMENTS

| | | |
|---|---|---|
| 5,212,682 | 5/1993 | Sakurai .............................. 369/275.3 |
| 5,453,964 | 9/1995 | Shimizume ........................... 369/59 X |
| 5,539,710 | 7/1996 | Tolkushuku et al. ................. 369/32 |

FOREIGN PATENT DOCUMENTS 5-189941  7/1993  Japan .

*Primary Examiner*—Muhammad N. Edun
*Attorney, Agent, or Firm*—Limbach & Limbach L.L.P.

[57] ABSTRACT

A recording medium driving method and apparatus for recording data on a write-once recording medium, in which it can be checked whether a write-once optical disc is an original disc or a copy disc which has copied digital disc reproduced from an original disc in order to take advantage of the ability of the write-once optical disc as an evidence. The recording medium driving method includes a time information generating step (step ST2) of generating the time information the value of which is changed with lapse of time, a recording data generating step (step ST4) of generating recording data from digital data and the time information and a data recording step (step ST7) of recording the recording data on a write-once recording medium.

22 Claims, 9 Drawing Sheets

FIG.8

| COLUMN NO.J → | | | 0 | 1 | 2 | 3 | 4 | 5 | 6 | 7 | 8 | 9 | ROW NO.I ↓ |
|---|---|---|---|---|---|---|---|---|---|---|---|---|---|
| SB1 | SB2 | SB3 | | | | | | | | | | | |
| | | RS1 | D1 | D2 | D3 | D4 | D5 | D6 | D7 | D8 | D9 | D10 | 103 |
| | | | D11 | D12 | D13 | D14 | D15 | D16 | D17 | D18 | D19 | D20 | 102 |
| | | RS2 | D21 | D22 | D23 | D24 | D25 | D26 | D27 | D28 | D29 | D30 | 101 |
| | | | D31 | D32 | D33 | D34 | D35 | D36 | D37 | D38 | D39 | D40 | 100 |
| | | RS3 | D41 | D42 | D43 | D44 | D45 | D46 | D47 | D48 | D49 | D50 | 99 |
| | | RS49 | | | | | | | | | | | |
| | | RS50 | | | | | | | | | | | |
| | | RS51 | D1011 | D1012 | D1013 | D1014 | D1015 | D1016 | D1017 | D1018 | D1019 | D1020 | 2 |
| | | | D1021 | D1022 | D1023 | D1024 | P1,1 | P1,2 | P1,3 | P1,4 | P2,1 | P2,2 | 1 |
| | | RS52 | P2,3 | P2,4 | P3,1 | P3,2 | P3,3 | P3,4 | C1 | C2 | C3 | C4 | 0 |
| | | | E1,1 | E2,1 | E3,1 | E4,1 | E5,1 | E6,1 | E7,1 | E8,1 | E9,1 | E10,1 | -1 |
| | | RS53 | E1,2 | E2,2 | E3,2 | E4,2 | E5,2 | E6,2 | E7,2 | E8,2 | E9,2 | E10,2 | -2 |
| | | | E1,3 | E2,3 | E3,3 | E4,3 | E5,3 | E6,3 | E7,3 | E8,3 | E9,3 | E10,3 | -3 |
| | | RS59 | E1,15 | E2,15 | E3,15 | E4,15 | E5,15 | E6,15 | E7,15 | E8,15 | E9,15 | E10,15 | -15 |
| | | | E1,16 | E2,16 | E3,16 | E4,16 | E5,16 | E6,16 | E7,16 | E8,16 | E9,16 | E10,16 | -16 |

104 ROWS / 16 ROWS

METHOD AND APPARATUS FOR DRIVING A RECORDING MEDIUM

This is a continuation of application Ser. No. 08/702.890 filed on Aug. 26, 1996, now abandoned.

BACKGROUND OF THE INVENTION

1. Field of the Invention

This invention relates to a recording medium driving method and apparatus for recording data on a write-once recording medium.

2. Description of the Related Art

In general, for recording audio or video data or computer data on a recording medium, an error correction code (ECC) is generated and appended to the digital data and the resulting data is recorded. The audio or video data or computer data are referred to herein as digital data. For reproducing the digital data from the recording medium, the digital data are corrected for errors using the error correction code appended during recording. The recording/reproducing unit in the recording medium is termed a sector and the error correction code is generated and appended on the sector basis. The error correction code is generated from the digital data in the sector and appended to the digital data in the sector.

As recording media for recording digital data such as the audio data, optical discs are used in many cases. Among the optical discs, there are an optical disc that can be recorded only once, and an overwritable optical disc.

As the error correction system in case of using the optical disc as the recording medium, there is well-known a so-called long-distance code-10 interleave (LDC-10). With the LDC-10 system, it is required that the sum of the number of bytes in a sector for generating the error correction code (ECC), that is the number of bytes of the digital data in the sector, and the sum of bytes of the parity data, be a multiple of 10.

However, in effect, the number of bytes in the sector is frequently not a multiple of 10. In the application of the LDC-10 system, dummy data are generated and appended in the sector in order that the number of bytes in the sector will be a multiple of 10.

Meanwhile, with the write-once optical disc, the information, once recorded, cannot be re-recorded. Therefore, if the information, once recorded, is replaced by another information, there is no alternative but to erase or destroy the recorded information and to record the other information in another recording area. Such erasure of the recorded information is by forming pits in an area where the information is recorded and where no pits are formed. If such information replacement is done, there is left on the disc a trace of the information replacement as the above-mentioned erased and replaced portions.

That is, if the information recorded in a portion of a write-once optical disc 100 specified by a reference numeral 110 in FIG. 1 is erased, there is left in the erased portion 110 a physical trace specifying that the information has been erased by destroying the information. On the other hand, for replacing the information recorded in a portion of the write-once optical disc 100 indicated by a reference numeral 111, it is necessary to read the information recorded in the portion 111, re-record the read-out information in another area and to destroy the portion 111 where the information prior to replacement has been recorded. Thus a physical trace is again left in case of such information replacement.

Thus, with the once-write optical disc, the disc itself and its recording contents are believed to have the ability as evidence.

However, if the write-once optical disc is reproduced by a reproducing apparatus and the digital data reproduced from the disc are directly recorded, that is copied, on another write-once optical disc, no distinction can be made between the original write-once optical disc (original disc) and the write-once optical disc on which has been copied the digital data of the original disc (copied disc), so that the proof of copying cannot be found.

The manner of copying digital data reproduced from the original disc on another write-once recording medium for generating the copy disc is explained by referring to FIG. 2.

FIG. 2A shows one-sector digital data 150 for recording on the original disc. For recording the digital data 150 on the original disc, dummy data 151 and parity data 152 for application of the LDC-10 system and the above-mentioned error correction code 153 are appended and recorded, as shown in FIG. 2B.

Next, if the original disc, having recorded thereon the digital data 150 shown in FIG. 2B, is reproduced and corrected for errors, as previously explained, the digital data wholly identified with the digital data recorded on the original disc are taken out, as shown in FIG. 2C.

If the digital data 150 reproduced from the original disc is copied on another write-once optical disc, that is if the above-mentioned copy disc is to be produced, the dummy data 151 and parity data 152 for application of the LDC-10 system and the above-mentioned error correction code 153 are appended and recorded, as shown in FIG. 2D.

In this manner, the same digital data 150 are recorded on the copy disc and the original disc, such that no distinction can be made between the two digital data 150. Therefore, if the original disc, having recorded thereon the digital data 150 shown in FIG. 2D, is reproduced and corrected for errors, as previously explained, the digital data 150 wholly identified with the digital data recorded on the original disc are taken out, as shown in FIG. 2E, enabling the making of illegal copies without a trace.

SUMMARY OF THE INVENTION

It is therefore an object of the present invention to provide a recording medium driving apparatus and method whereby it can be distinguished whether the write-once optical disc is an original disc or a copy disc on which has been copied the digital data of the original disc for enabling the write-once optical disc to be used so as to exploit its ability as evidence.

With the recording medium driving method and apparatus of the present invention, the time information, the value of which is indicative of the actual time of recording, is generated, recording data is generated from the digital data and the time information and the recording data thus generated is recorded on the write-once recording medium.

That is, according to the present invention, it can be checked easily whether a write-once recording medium is an original recording medium or a recording medium which has copied data from an original recording medium.

In addition, the time information is recorded along with the time information on a write-once recording medium for enabling the user to know its recording hysteresis.

3

FIGS. 2A to 2E illustrate the manner of conventional digital data when the digital data has been copied from an original writeonce optical disc to another write-once optical disc.

Figure 1:
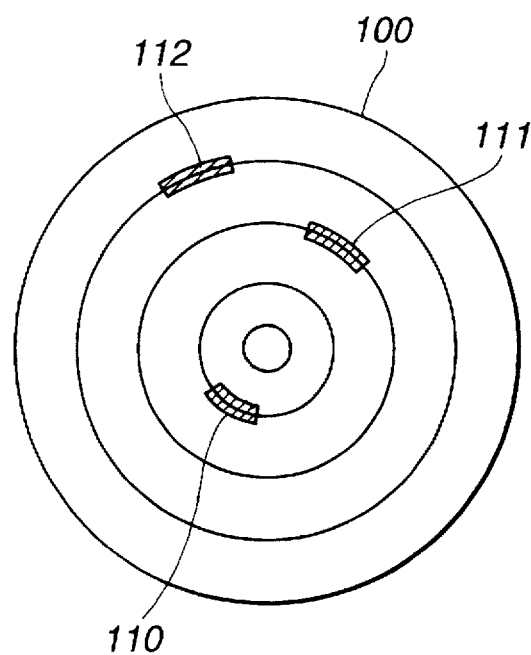
FIG. 1 illustrates the trace of erasure of data recorded on a conventional write-once optical disc.
Figure 2A:
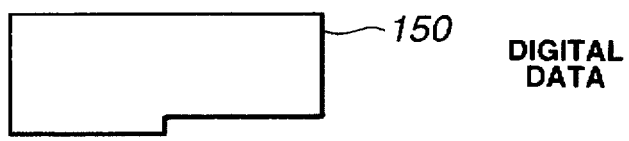
Figure 2B:
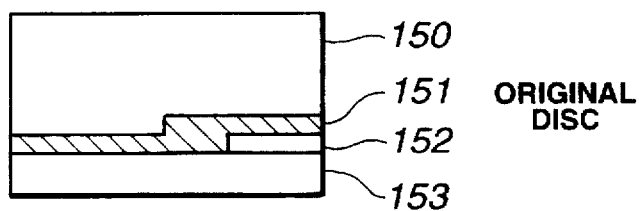
Figure 2C:
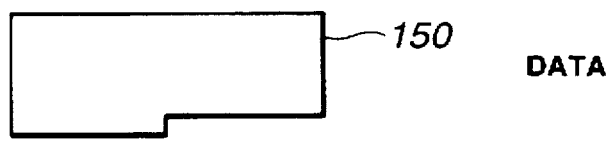
Figure 2D:
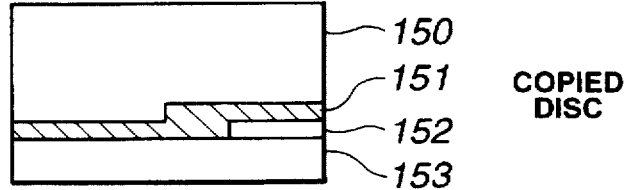
Figure 2E:
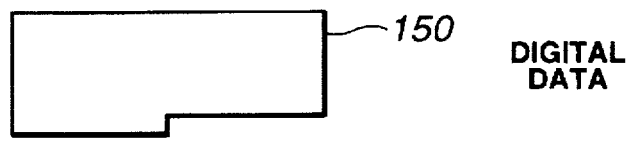
Figure 3:
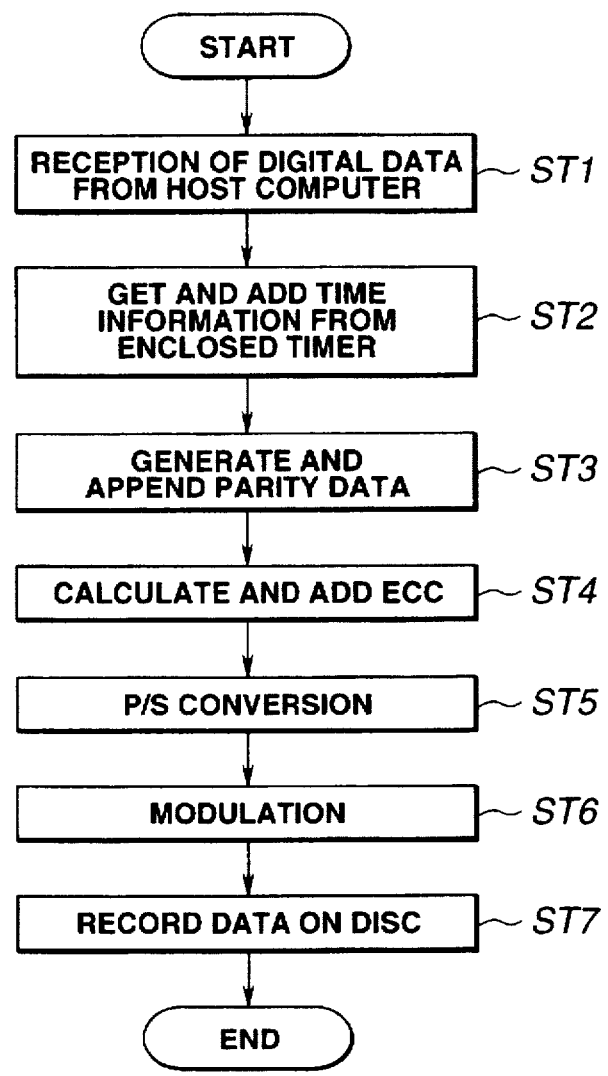

FIG. 3 is a flow chart for illustrating the processing flow when recording the digital data and the time information on a write-once optical disc.

Figure 4:
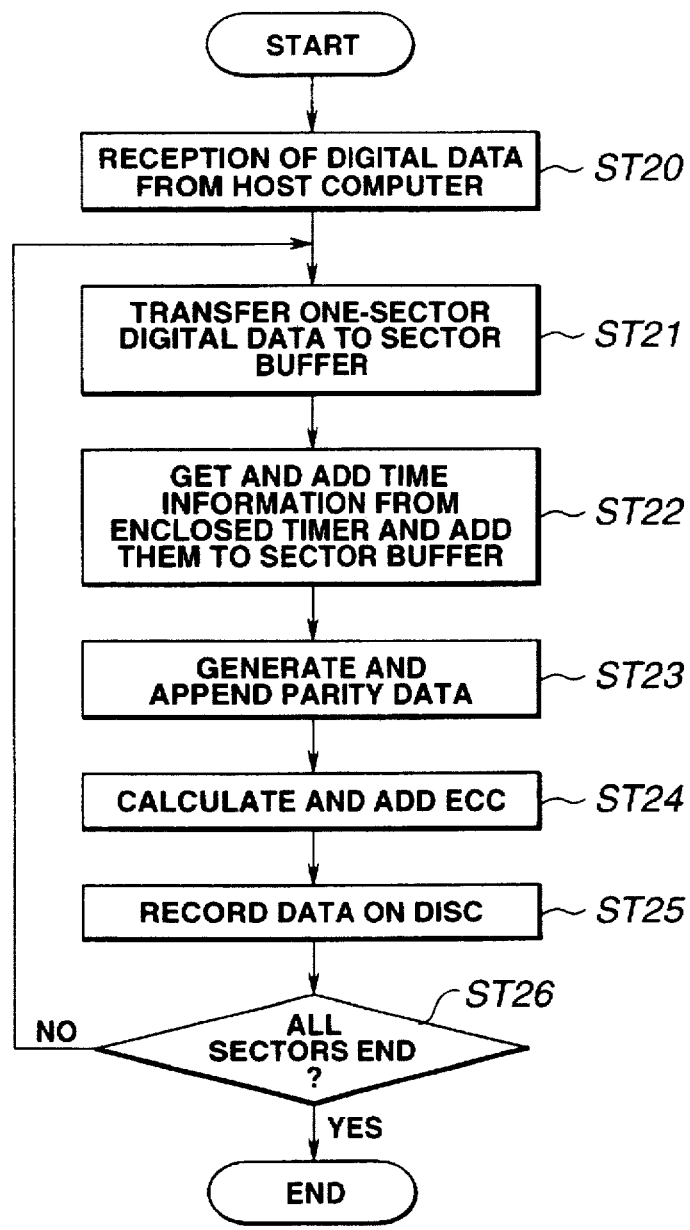

FIG. 4 is a flow chart for illustrating the processing flow when recording the digital data and the time information on a write-once optical disc on the sector basis.

Figure 5:
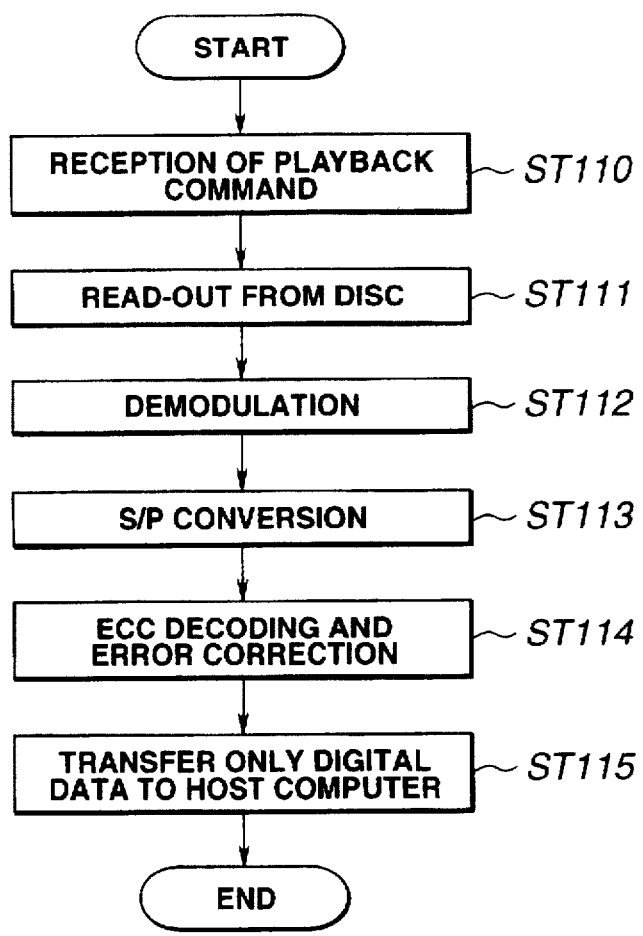

FIG. 5 is a flowchart for illustrating the processing flow when taking out the digital data from the write-once optical disc.

Figure 6:
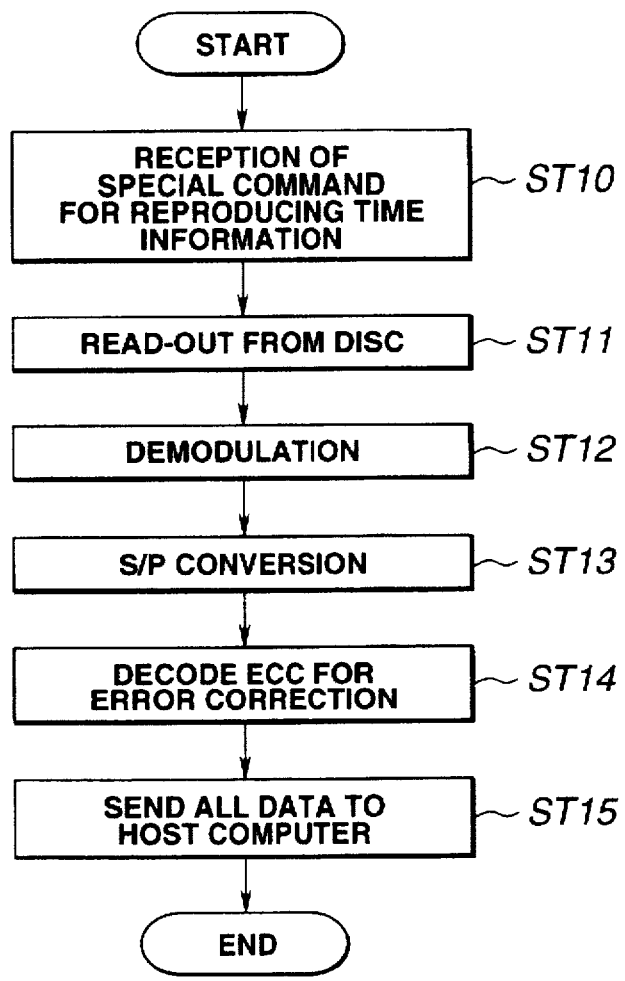

FIG. 6 is a flowchart showing the processing flow when taking out the time information from the write-once optical disc.

FIGS. 7A to 7E illustrate the manner of conventional digital data when the digital data has been copied from an original write-once optical disc to another write-once optical disc in the recording medium driving method and apparatus embodying the present invention.

FIG. 8 illustrates a data map for a write-once optical disc, with a diameter of 130 mm, specified in ISO-9171-2.

Figure 9:
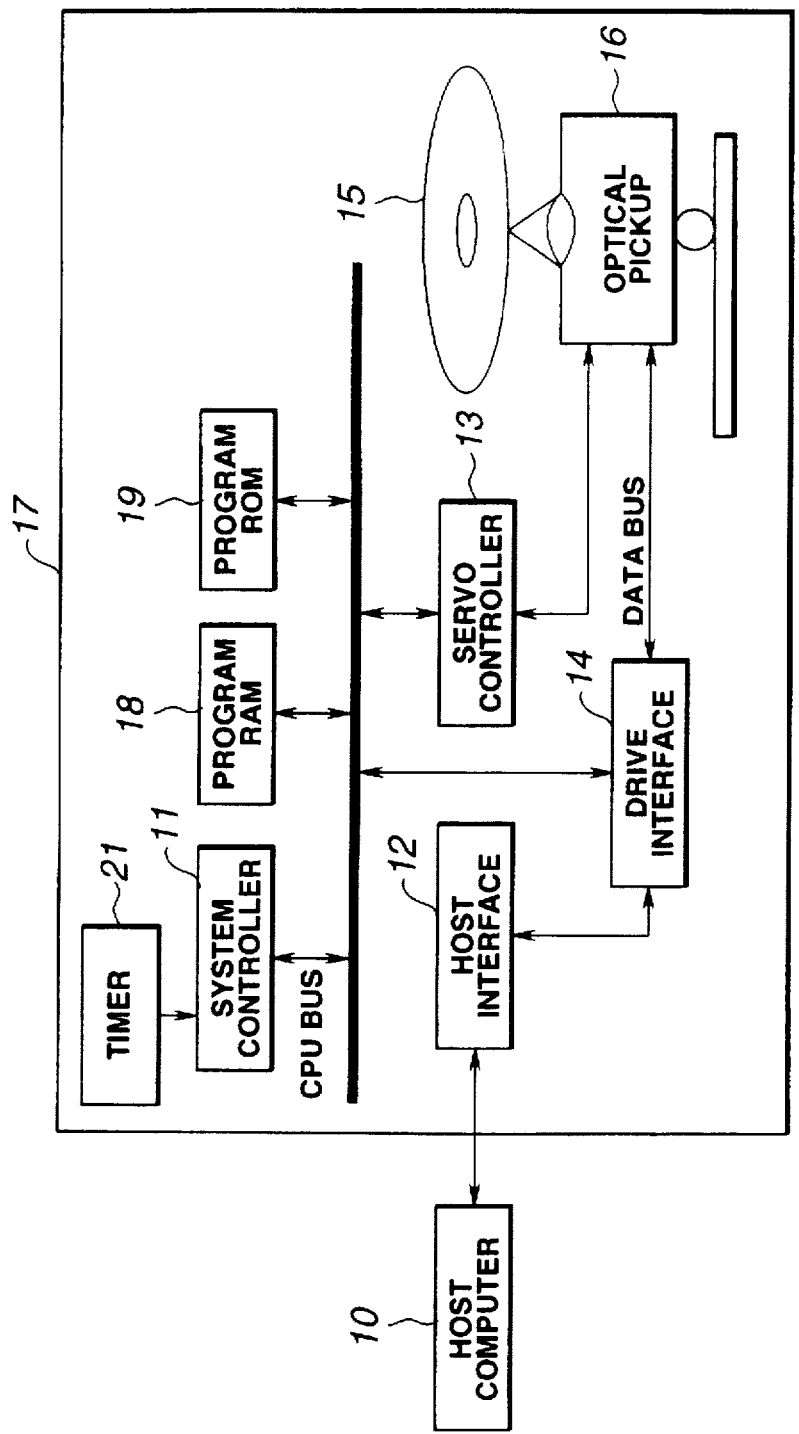

FIG. 9 is a block circuit diagram showing an illustrative structure of a data recording apparatus for realizing the recording medium driving method and apparatus embodying the present invention.

DETAILED DESCRIPTION OF THE PREFERRED EMBODIMENTS

Referring to the drawings, preferred embodiments of the present invention will be explained in detail.

When recording the digital data, such as audio or video data or computer data, on a write-once recording medium, the time information, the value of which is changed with lapse of time, is generated, and the recording data is generated from the digital data and the time information. The recording data is recorded on the write-once recording medium. An illustrative structure of the recording medium driving apparatus is explained subsequently.

If the above-mentioned write-once optical disc is used as the recording medium, and the above-mentioned LDC-10 system is used as the error correction system, digital data is recorded on the write-once optical disc with the present recording medium driving apparatus and method as shown in the flowchart of FIG. 3.

Referring to FIG. 3, the digital data is supplied at step ST1 from, for example, a host computer to a recording medium driving apparatus. At the next step ST2, the time information is acquired from an enclosed timer of the recording medium driving apparatus and appended to the digital data. This time information is comprised of date and time of recording of the digital data on the write-once optical disc. The time information handled in the present embodiment and the sector in which to add the time information will be explained subsequently.

At the next step ST3, parity data bytes are generated and appended. At step ST4, the ECC is encoded using the digital data, time information and the parity data in the sector. That is, at step ST4, the error correction code (ECC) is found by calculations, using the data in the sector. The error correction code, thus found, is appended to the sector.

The sector data, thus generated, is converted at step ST5 by, for example, parallel/serial (P/S) conversion. The converted sector data is modulated at step ST6 before being recorded at step ST7 on the write-once optical disc.

4

The data recording on the write-once optical disc, shown in the flowchart of FIG. 3, is done on the sector basis. FIG. 4 shows the flow of sector-based data recording in the recording medium driving apparatus.

Referring to FIG. 4, the recording medium driving apparatus transfers digital data supplied from the host computer to the enclosed buffer memory at step ST20 for storage therein. At step ST21, one-sector digital data stored in the buffer memory are transferred to a sector buffer enclosed in the recording medium driving apparatus for storage therein.

At step ST22, the recording medium driving apparatus acquires the time information from the enclosed timer and transfers the time information to the sector buffer for storage therein. This appends the time information to the one-sector digital data stored in the sector buffer. The time information in the flowchart of FIG. 4 is the information of the data and time recorded on the write-once optical disc.

At the next step ST23, parity data bytes are generated and appended. At the next step ST24, the ECC is encoded using the digital data and the time information in the sector and the parity data. The sector data generated as described above are parallel/serial converted and modulated at step ST25 before being recorded on the write-once optical disc.

At step ST26, it is judged whether or not all digital data recorded in the buffer memory has been recorded, that is whether recording of al sector data has come to a close. If it is judged at step ST26 that all sector data has not come to a close, processing reverts to step ST21 in order to repeat the processing as from step ST21 until the recording of all sector data has come to a close. If it is judged at step ST26 that all sector data has come to a close, processing of the flowchart is terminated.

Referring to FIG. 5, when reproducing the digital data from the write-once optical disc on which the digital data has been recorded as described above, a command for reproduction from, for example, a host computer, is supplied at step ST110 to the recording medium driving apparatus. On reception of the command for reproduction, the recording medium driving apparatus starts data readout from the write-once optical disc as indicated at step ST111.

The reproduced data, read out from the write-once optical disc, is demodulated at step ST112 and serial/parallel converted at step ST113.

At step ST114, the ECC is decoded, that is error correction by the error correction code is carried out.

At the next step S115, only the digital data of the data in the sector reproduced from the write-once optical disc is sent to the host computer.

In the recording medium driving apparatus of the present embodiment, the time information can be taken out from the write-once optical disc along with the digital data.

FIG. 6 shows a flowchart when taking out the time information from the write-once optical disc.

Referring to FIG. 6, a special command for taking out the time information from the write-once disc is supplied at step ST10 from, for example, the host computer to the recording medium driving apparatus of the present embodiment. On reception of the special command, the recording medium driving apparatus of the present embodiment starts to read out data at step ST11 from the write-once optical disc of the present embodiment. The users in general are not informed of this special command and only the producer of the write-once optical disc is informed of the command.

The reproduced data read out from the write-once optical disc is demodulated at step ST12 and serial/parallel (S/P) converted at step ST13.

Next, at step ST14, the ECC is decoded, that is, error correction is carried out using the error correction code.

At the next step ST15, all data in the sector reproduced from the write-once optical disc as described above, that is the above time information and the digital data, are sent to, for example, the host computer.

According to the present embodiment, described above, the time information is recorded along with the digital data on the write-once optical disc, so that it can be easily discriminated whether the write-once optical disc is an original disc or a copy disc which has copied the digital data reproduced from the original disc. That is, if there is a copy disc which has recorded the same digital data as that of the original disc, the recording hysteresis can be known by reproducing the time information recorded on these discs. The copy disc can be discriminated from the original disc since the time information of the copy disc differs from the that of the original disc.

Referring to FIG. 7, the manner in which the digital data reproduced from the original disc in the present embodiment to another write-once optical disc is explained.

Figure 7A:
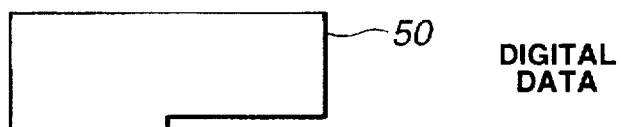

FIG. 7A shows one-sector digital data 50 for recording on the original disc. For recording the digital data 50 on the original disc, the time information 51 and the parity data 52 are appended to the digital data 50, and further the error correction code 53 is appended for recording.

Figure 7B:
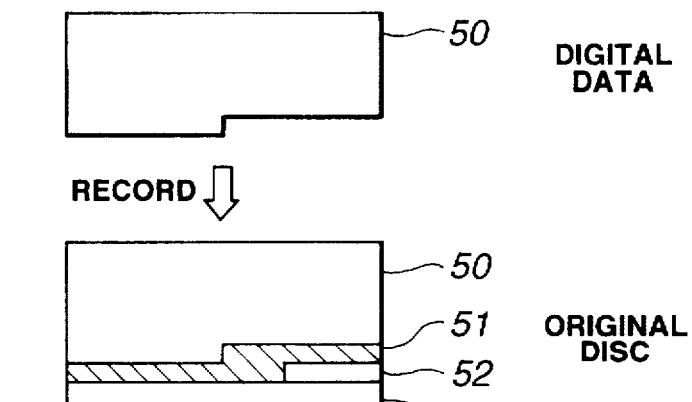
Figure 7C:
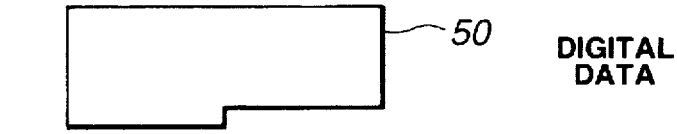
Figure 7D:
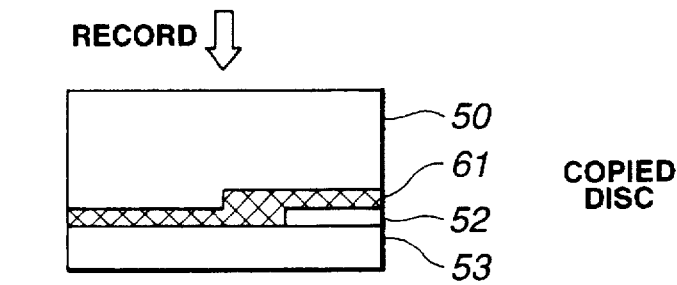

If the original disc having recorded thereon data shown in FIG. 7B is reproduced and corrected for errors, the digital data 50 which is completely the same as that recorded on the original disc is taken out, as shown in FIG. 7C. When the digital data 50 reproduced from the original disc is copied on the write-once optical disc, that is if the copy disc is produced, the time information and the parity data 52 are appended to the digital data 50, and further the error correction code 53 are appended and recorded, as described above. However, the time information 61 different from the time information 51 recorded on the original disc shown in FIG. 7B is recorded, as shown in FIG. 7D. That is, the time information 61 recorded on the copy disc is the time information indicating the current date and time of copying of the digital data 50 reproduced from the original disc, while it is not the time information 51 indicating the time and date of copying the digital data on the original disc.

Figure 7E:
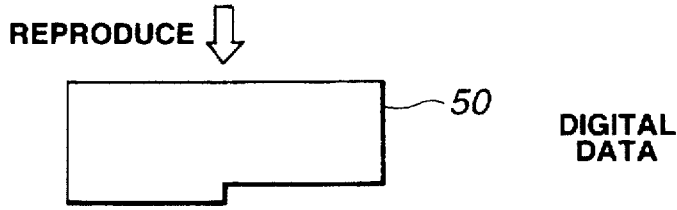

If the copy disc having recorded thereon the data shown in FIG. 7D is reproduced for error correction, the digital data 50 which is completely the same as that recorded on the original disc is taken out, as shown in FIG. 7E.

As described above, the same digital data are recorded on the original disc and the copy disc, however, the date and time on which the digital data is recorded on the discs differ between the two discs, so that it can be easily discriminated whether the disc is an original disc or a copy disc which has copied the digital data reproduced from the original disc. That is, if the time information recorded on the copy disc is known, it can be seen that the copy disc is not the original disc by referring to the time information recorded on the copy disc.

In addition, since the time information is recorded on the write-once optical disc on the sector basis as described above, the sector recording sequence and the time in which recording has been done on the disc can also be known.

Therefore, if part of the information is replaced by the other information, the possible occurrence of such replacement can be known based on the sector recording sequence. Also, from the sector recording time difference, it can be known whether the disc is an original disc or a copy disc which has copied digital data of the original disc.

That is, the write-once optical disc is a large-capacity disc of, for example, 15 G bytes or 2 G bytes, so that the recording time on the disc is generally extremely long. Therefore, a significant difference is present between the time information of the initially recorded sector, such as the time information of the inner periphery of the disc, and the time information of the finally recorded sector, such as the time information of the outer periphery of the disc. In the case of the copy disc which has copied the recording contents of the original disc, the copying is done in many cases in a shorter time period, so that the time interval between the time information of the sector of the copy disc recorded at an initial stage and that of the sector recorded in a latter stage becomes extremely short. This again makes it possible to infer that the disc is the copy disc.

Further, in the case of an original write-once optical disc, the sector recording sequence is in the chronological order. However, if the contents of a given sector is replaced and recorded in another recording area, the sector time information is not in the chronological order, so that it can be known that information has been replaced.

From the foregoing, it becomes possible with the write-once optical disc of the present invention to make effective utilization of the ability of the disc itself and the recording content thereof as evidence. The feature of the recording medium driving method of the present invention resides in that the recording information is recorded on the write-once medium and the recording system type is irrelevant to the present invention insofar as the write-once recording medium is used.

FIG. 8 shows a data map of a sector of a write-once optical disc (WORM), 130 mm in diameter, specified in the standard ISO-9171-2 of the International Standardization organization (ISO) of the industrial standard as an example of the write-once optical disc of the above-described present embodiment. Referring to FIG. 8, the time information handled in the present embodiment and the sector in which to append the time information will be explained in detail.

Referring to FIG. 8, D1 to D1024 denote byte-based digital data. That is, in the above write-once optical disc of ISO-9171-2, 1024 byte digital data is arrayed in each sector.

If the above-mentioned LDC-10 system is used as the error correction system, it is necessary for the sum of the number of bytes in the sector for generating the error correction code (ECC), that is the number of bytes of the digital data in the sector, and the number of bytes of the parity data, to be a multiple of 10. However, with the sector of FIG. 8, the number of bytes of the digital data is 1024 from D1 to D1024. If 4 bytes of the parity data shown in C1 to C4 are added to the 1024 bytes, the result is 1028 bytes, which is not a multiple of 10.

With the ISO-9171-2 write-once optical disc, it is prescribed that 12 bytes of from P1.1 to P3.4 be added along with 4 bytes of C1–C4 parity data as bytes for generating the error correction code (ECC). This gives the number of bytes of 1040 for generating the error correction code, thus satisfying the condition for the multiple of 10.

Using the digital data of 1024 bytes of D1 to D1024, 12 bytes of P1.1 to P3.4 and 4 bytes of parity data of C1 to C4, the error correction code is generated. E1.1 to E10.16 of FIG. 8 are the generated and appended error correction codes. SB1 to SB3 of FIG. 8 are synchronization bytes, with RS1 to RS59 being resynchronization bytes.

The P1.1 to P3.4 bytes are appended as bytes for generating the error correction code (ECC), while being also used for recording the address information of the sector in which to record the digital data and the address information of the sector of the replacement area. The replacement area means an area set for recording sector data to be recorded in a defective portion of a write-once optical disc (defective sector) in association with the defective portion, that is a sector for replacement.

The sector address information and the address information of the sector of the replacement area are recorded on the write-once optical disc in the following manner.

The address information of the sector recording the digital data is recorded in each byte of P1.1, P1.2, P1.3 and P1.4, while the address information of the first sector usable as the replacement area is recorded in the respective bytes of P2.1, P2.2, P2.3 and P2.4. In P3.1, P3.2, P3.3 and P3.4, there is recorded the same information as that recorded in P2.1, P2.2, P2.3 and P2.4.

Specifically, as the contents of the address information of the sector for recording the digital data, upper bytes of the track number of the sector are recorded in P1.1, P1.2, P1.3 and P1.4, while lower bytes of the track number are recorded in P1.2, the sector number of the sector is recorded in P1.3, and "FF", for example, is usually recorded as dummy data in P1.4. Also, as the contents of the address information of the sector for recording the digital data, upper bytes of the track number of the sector are recorded in P2.1, P2.2, P2.3 and P2.4, while lower bytes of the track number are recorded in P2.2, the sector number of the sector is recorded in P2.3, and "FF", for example, is usually recorded as dummy data in P2.4. In P3.1, P3.2, P3.3 and P3.4, there is recorded the same information as that recorded in P2.1, P2.2, P2.3 and P2.4.

Thus, with the write-once optical disc conforming to ISO-9171-2, the dummy data "FF" is recorded in three bytes of P1.4, P2.4 and P3.4. In the present embodiment, the above time information is recorded in place of the dummy data.

The address information of the sector of the replacement area is recorded in the bytes of P2.1, P2.2, P2.3 and P2.4 and in P3.1, P3.2, P3.3 and P3.4 in duplicates. If the information is recorded only in bytes of P2.1, P2.2, P2.3 and P2.4 without being recorded in duplicates, the bytes for recording the time information can be increased. That is, if the address information of the sector of the replacement area is recorded only in the bytes of P2.1, P2.2, P2.3, the sum total of 5 bytes of P2.4, P3.1, P3.2, P3.3 and P3.4 can be used for recording the time information. The address information recorded in respective bytes of P2.1, P2.2, P2.3 and P2.4 and in P3.1, P3.2, P3.3 and P3.4 is provided as a pointer specifying the sector of the replacement area for replacement. If a so-called map system, in which defects are checked during manufacture and registered in advance in a pre-set area (map area), is used in place of the above-described pointer system, it is unnecessary to record the sector address information for a replacement area. Therefore, if the map system is used, the area in which the address information of the sector for the replacement area has been recorded may be used for recording the time information.

The following are illustrative examples of the time information recorded on the write-once optical disc.

A first illustrative example of the time information is year/month/day data in binary notation. Since 0 to 255 can be represented with one byte, the time information can be recorded in three bytes if the lower two digits of the year of grace, month and day are respectively represented with one bytes. The day of the week, hour, minute and second may further be added to the lower two digits of the year of grace, month and day, in which case the time information can be represented by a sum total of 7 bytes. The days of the week can be represented by 01 for Monday, 12 for Tuesday, 03 for Wednesday, 04 for Thursday, 05 for Friday, 06 for Saturday and 06 for Sunday.

A second illustrative example of the time information is the time information represented using the codes of the ASCII (American Standard Code for Information Interchange) standard. That is, if the time information is represented with the code of the ASCII standard, since each letter can be represented by one byte, the lower two digits of the year of grace, month and day can be recorded in six bytes.

A third illustrative example of the time information is an encryptive information. That is, the lower two digits of the year of grace, month and day are simply arrayed to provide a six-digit numeral which is then split into upper three digits and lower three digits. The upper three digits are recorded for recording with interchanged uppermost and lowermost digits. Taking an example of Dec. 31, 1999, if the lower two digits of the year of grace, month and day are simply arrayed, the resulting numeral is 991231, of which the upper three digits and lower three digits are 991 and 231, respectively. The numeral resulting from interchanging the uppermost and lowermost digits of 991 is 199. Therefore, for recording date and time data for Dec. 31, 1999, the numeral 199, obtained on interchanging the uppermost and lowermost digits of the three upper digits, and the numeral 231, corresponding to the lower three digits, are recorded. The maximum value of a numeral resulting from interchanging the uppermost and lowermost digits is 199, while the maximum value of the numeral for the lower side three digits is 231. Since these numerals are not more than 255, they can be represented by one bytes, so that the time information can be represented with a total of two bytes.

Referring to FIG. 9, the structure of an illustrative data recording device, employing the recording medium driving apparatus and method of the present invention, will be explained in detail.

FIG. 9 schematically shows the structure of an optical disc driving device 17 as a data recording device for recording data on the write-once optical disc.

During recording of digital data on the write-once optical disc 15, a host computer 10, for example, sends a recording command instructing a track and a sector in which to record the digital data, via a host interface, such as RS-232C. The sector-based digital data handled by the host computer 10 is then supplied. Data from the host computer 10 are sent via a host interfacing circuit 12 to a driving interfacing circuit 14.

A variety of program data for operating the optical disc drive 17 and for signal processing are stored in a program ROM 19. A system controller 11, functioning as a CPU, executes various calculations, command analyses and controls various portions based on program data in the program ROM 19. A program RAM 18 has its write/read controlled by the system controller 11 and has the function of the buffer memory and the sector buffer transiently holding data being processed by the system controller 11 or digital data being recorded/reproduced on or from the optical disc 15.

The system controller 11 transiently stores in the program RAM 18 as the buffer memory the digital data supplied to the driving interfacing circuit 14 via the host interfacing circuit 12. Simultaneously, the system controller seizes the current time information from the enclosed timer 21 operating as the time information generating means while reading out digital data stored in the program RAM 18. The system controller 11 appends the time information to the digital data and performs parity calculation and appendage and ECC calculations and appendage on the digital data added to with the time information. That is, the system controller 11 has the function of recording data generating means for generating recording data from the digital data and the time information. The sector data, thus generated by processing by the system controller 11, is stored in the program RAM 18, from which it is read out and sent to the driving interfacing circuit 14.

The sector data sent to the driving interfacing circuit 14 is sent on the sector basis to the optical pickup device 16, under control by the system controller 16, so as to be recorded in a pre-set format on the write-once optical disc 15. That is, the optical pickup device 16 operates as data recording means for recording the recording data on the write-once optical disc 15. A servo controller 13 performs various servo control operations, such as focusing and tracking servo control operations for the optical pickup device 16, or rotational servo control operation for the optical disc 15.

This records the above-mentioned time information along with the digital data on the write-once optical disc 15 as a write-once recording medium according to the present invention.

In reproducing only the digital data from the write-once optical disc 15, the host computer 10 issues a reproducing command for reading out only the digital data recorded on the write-once optical disc 15. If the time information is to be reproduced from the write-once optical disc 15 along with the digital data, a special command is issued from the host computer.

When supplied with the reproducing command, the system controller 11 controls the optical pickup 16 for reading out data recorded on the write-once optical disc 15. The data read out from the write-once optical disc 15 is sent to the driving interfacing circuit 14. The data sent to the driving interfacing circuit 14 is transiently stored in the program RAM 18. The data read out from the program RAM 18 is sent to the system controller 11 where the ECC is decoded and only the digital data is restored.

When supplied with the special command, the system controller 11 controls the optical pickup device 16 for reading out the data recorded on the write-once optical disc 15. The data read out from the write-once optical disc 15 is sent to the driving interfacing circuit 14 so as to be then transiently stored in the program RAM 18 via the driving interfacing circuit 14. The data read out from the program ROM 18 is sent to the system controller 1 where the ECC is decoded for restoring the digital data and the time information.

Thus the optical pickup device 16 also operates as data reproducing means for reproducing data recorded on the write-once optical disc 15. The system controller 11 also has the function of controlling means for outputting the digital data contained in the data reproduced from the write-once optical disc 15 to the host computer 10 as an external device or outputting the digital data and the time information reproduced from the write-once optical disc 10 to the host computer 10 when the system controller 11 is supplied with the reproducing command or with the special command, respectively.

The digital data and the time information, thus restored, is sent to the driving interfacing circuit 14 and thence to the host interfacing circuit 12 under control by the system controller 11.

The data outputted by the host interfacing circuit 12 is sent to the host computer 10. If the above-mentioned time information is contained in the data supplied from the host interfacing circuit 12, the host computer causes the date and time indicated by the time information in, for example, a monitor device. However, if the data supplied to the host computer 10 is comprised only of the digital data, the host computer executes solely the usual operation in accordance with the supplied digital data.

The foregoing description is concerned with recording the time information on the write-once optical disc for distinguishing the original disc from a copy disc which has copied the digital data of the original disc. Alternatively, the time information may be utilized for diagnosis of malfunctions of the write-once optical disc. That is, if the time information recorded in the sector of the replaced area of the write-once optical disc is checked, and it has been found from the time information that recording to the replacement area has been done frequently, it can be judged that the optical disc has many malfunctioning areas.

What is claimed is:

1. A recording medium driving device comprising:
   time information generating means for generating time information the value of which is indicative of an actual time of recording;
   recording data generating means for generating recording data from digital data and the time information and including error code generating means for generating an error correction code for said digital data and the time information; and
   data recording means for recording the recording data on a write-once recording medium wherein the time information chances upon a re-recording of recorded data.

2. A recording medium driving device as claimed in claim 1, wherein the time information includes data indicating the year, month, and day of the recording.

3. A recording medium driving device as claimed in claim 2, wherein the time information further includes data indicating the hour, minute or second of the time of the recording.

4. A recording medium driving device comprising:
   time information generating means for generating time information the value of which is indicative of an actual time of recording;
   recording data generating means for generating recording data from digital data and the time information, wherein said recording data generating means appends the time information at an interval of a predetermined data amount of said digital data for generating a recording data unit; and
   data recording means for recording the recording data on a write-once recording medium, wherein said data recording means records the recording data on said write-once recording medium on the unit basis, wherein the time information chances upon a re-recording of recorded data.

5. A recording medium driving device as claimed in claim 4, wherein the time information includes data indicating the year, month, and day of the recording.

6. A recording medium driving device as claimed in claim 5, wherein the time information further includes data indicating the hour, minute or second of the time of the recording.

7. A recording medium driving device comprising:
   time information generating means for generating time information the value of which is indicative of an actual time of recording;
   recording data generating means for generating data from digital data and the time information;

data recording means for recording the recording data on a write-once recording medium, wherein the time information changes upon a re-recording of recorded data;

data reproducing means for reproducing the recording data recorded on said write-once recording medium; and control means for controlling said data reproducing means to reproduce said recording data from said write-once recording medium and outputting the digital data contained in the recording data reproduced by said data reproducing means to outside the apparatus when supplied with a reproducing command and for controlling said data reproducing means to reproduce said recording data from said write-once recording medium and outputting the entire recording data reproduced by said data reproducing means to outside the apparatus when supplied with a special command different from said reproducing command.

8. A recording medium driving device as claimed in claim 7, wherein the time information includes data indicating the year, month, and day of the recording.

9. A recording medium driving device as claimed in claim 8, wherein the time information further includes data indicating the hour, minute or second of the time of the recording.

10. A recording medium driving device comprising:

time information generating means for generating time information the value of which is indicative of an actual time of recording;

recording data generating means for generating recording data from digital data and the time information, wherein said recording data generating means appends the time information at an interval of a predetermined data amount of the digital data and appends an error correction code to said predetermined amount of the digital data added to with the time information for generating a recording data unit; and data recording means for recording the recording data on a write-once recording medium, wherein said data recording means records the recording data on said write-once recording medium on the unit basis, and wherein the time information changes upon a re-recording of recorded data.

11. The recording medium driving apparatus as claimed in claim 10 further comprising:

data reproducing means for reproducing the recording data recorded on the write-once recording medium;

decoding means for effecting error correction based on the error correction code contained in the recording data reproduced by said data reproducing means for decoding the digital data and the time information; and control means;

said control means when supplied with a reproducing command reproducing said recording data from said write-once recording medium by said data reproducing means and outputting only the digital data decoded by said data decoding means to outside the apparatus; said control means when supplied with a special command different from said reproducing command reproducing said recording data from said recording medium by said data reproducing means and outputting the digital data and the time information decoded by said decoding means to outside the apparatus.

12. A recording medium driving device as claimed in claim 10, wherein the time information includes data indicating the year, month, and day of the recording.

13. A method for driving a recording medium as claimed in claim 12, wherein the time information further includes data indicating the hour, minute or second of the time of the recording.

14. A method for driving a recording medium comprising the steps of:

generating time information the value of which is indicative of an actual time of recording;

generating recording data from digital data and the time information, including generating an error correction code for said digital data and the time information; and recording the recording data on a write-once recording medium, wherein the time information chances upon a re-recording of recorded data.

15. A method for driving a recording medium comprising the steps of:

generating time information the value of which is indicative of an actual time of recording;

generating recording data from digital data and the time information, including appending the time information at an interval of a predetermined data amount of said digital data for generating a recording data unit; and recording the recording data on a write-once recording medium, including recording the recording data on said write-once recording medium on the unit basis, wherein the time information changes upon a re-recording of recorded data.

16. A method for driving a recording medium as claimed in claim 15, wherein the time information includes data indicating the year, month, and day of the recording.

17. A method for driving a recording medium as claimed in claim 16, wherein the time information further includes data indicating the hour, minute or second of the time of the recording.

18. A method for driving a recording medium comprising the steps of:

generating time information the value of which is indicative of an actual time of recording;

generating recording data from digital data and the time information;

recording the recording data on a write-once recording medium, wherein the time information changes upon a re-recording of recorded data;

reproducing the recording data recorded on the write-once recording medium and outputting the digital data contained in the reproduced recording data when a reproducing command is given; and reproducing the recording data recorded on the write-once recording medium and outputting the reproduced data in its entirety when a special command different from the reproducing command is given.

19. A method for driving a recording medium as claimed in claim 18, wherein the time information includes data indicating the year, month, and day of the recording.

20. A method for driving a recording medium as claimed in claim 19, wherein the time information further includes data indicating the hour, minute or second of the time of the recording.

21. A method for driving a recording medium comprising the steps of:

generating time information the value of which is indicative of an actual time of recording;

generating recording data from digital data and the time information, wherein said recording data generating step includes a sub-step of appending the time information at an interval of a predetermined data amount of said digital data and a sub-step of appending an error correction code to said digital data of the predetermined data amount, to which the time information has been appended, for generating a recording data unit; and recording the recording data on a write-once recording medium, wherein said data recording step records the recording data on said write-once recording medium on a unit basis, wherein the time information changes upon a re-recording of recorded data.

22. The recording medium driving method as claimed in claim 21 further comprising the steps of:

reproducing the recording data recorded on the write-once recording medium, decoding the digital data and the time information by effecting error correction based on the error correction code contained in the reproduced recording data, and outputting only the digital data, when a reproducing command is given, and reproducing the recording data recorded on the write-once recording medium, decoding the digital data and the time information by effecting error correction based on the error correction code contained in the reproduced recording data, and outputting both the digital data and the time information when a special command different from the reproducing command is given.

* * * * *

UNITED STATES PATENT AND TRADEMARK OFFICE
CERTIFICATE OF CORRECTION

PATENT NO.: 5,796,694
DATED: August 18, 1998
INVENTOR(S): KYOICHI SHIRANE

It is certified that errors appear in the above-identified patent and that said Letters Patent is hereby corrected as shown below:

In Col. 10, line 31, delete "chances" and insert --changes--.
In Col. 10, line 53, delete "chances" and insert --changes--.
In Col. 12, line 13, delete "chances" and insert --changes--.

Signed and Sealed this

Fifth Day of January, 1999

Attest:

Attesting Officer

Acting Commissioner of Patents and Trademarks